United States Patent
Park et al.

(10) Patent No.: US 7,876,493 B2
(45) Date of Patent: Jan. 25, 2011

(54) ELECTROPHORETIC DISPLAY DEVICE AND METHOD FOR FABRICATING THE SAME

(75) Inventors: Jae-Soo Park, Seoul (KR); Chang Hoon Lee, Jung-Ri (KR)

(73) Assignee: LG Display Co., Ltd., Seoul (KR)

( * ) Notice: Subject to any disclaimer, the term of this patent is extended or adjusted under 35 U.S.C. 154(b) by 28 days.

(21) Appl. No.: 12/257,128

(22) Filed: Oct. 23, 2008

(65) Prior Publication Data

US 2009/0109520 A1  Apr. 30, 2009

(30) Foreign Application Priority Data

Oct. 24, 2007 (KR) .................. 10-2007-0107466

(51) Int. Cl.
G02B 26/00 (2006.01)

(52) U.S. Cl. .................................... 359/296

(58) Field of Classification Search .............. 359/296; 345/107, 105; 430/32, 34, 38; 204/450, 204/600; 250/208.1
See application file for complete search history.

(56) References Cited

U.S. PATENT DOCUMENTS 7,236,292 B2 *  6/2007  LeCain et al. ............... 359/296

FOREIGN PATENT DOCUMENTS

| CN | 1383351 A | 12/2002 |
|---|---|---|
| CN | 1402203 A | 3/2003 |
| CN | 1791764 A | 7/2006 |

* cited by examiner

*Primary Examiner*—Ricky L Mack
*Assistant Examiner*—Tuyen Q Tra
(74) *Attorney, Agent, or Firm*—Brinks Hofer Gilson & Lione

(57) ABSTRACT

Disclosed is an electrophoretic display (EPD) device capable of delaying or preventing a sealant from leaking down by forming a dam pattern prior to a sealing process using the sealant, and a method for fabricating the same. The EPD device comprises: gate lines and data lines crossing each other to define a pixel region, and formed on a lower substrate; a thin film transistor (TFT) electrically connected to the gate lines and the data lines; a passivation film covering the TFT; a pixel electrode electrically connected to the TFT; a display layer formed on the pixel electrode and the passivation film, and having an electrophoretic substance; a common electrode formed on an entire surface of the display layer; an upper substrate formed on the common electrode; a seal pattern formed on each outer circumferential surface of the lower substrate, the upper substrate, and the display layer; and a dam pattern formed on the lower substrate adjacent to the seal pattern.

6 Claims, 6 Drawing Sheets

ELECTROPHORETIC DISPLAY DEVICE AND METHOD FOR FABRICATING THE SAME

RELATED APPLICATIONS

The present invention claims priority to and relates to subject matter contained in priority Korean Application 2007-107466, filed Oct. 24, 2007, which is herein expressly incorporated by reference in its entirety.

BACKGROUND

1. Field of the Invention

The present invention relates to an electrophoretic display (EPD) device, and more particularly, to an EPD device capable of delaying or preventing a sealant from leaking down by forming a dam pattern prior to a sealing process using the sealant, and a method for fabricating the same.

2. Description of the Background Art

Generally, an electrophoretic display (EPD) device is a display device using a principle that colloidal particles move to one polarity when one pair of electrodes to which a voltage is applied are immersed into colloidal solution. The EPD device does not use a backlight, but implements a wide viewing angle, high reflectivity, high readability, low power consumption, etc., thereby being anticipated as electronic paper.

The EPD device has a structure in which an electrophoretic substance is interposed between two electrodes, and at least one of the two electrodes is transparent to display images.

When a potential is applied onto the two electrodes, charged particles in the electrophoretic substance move to one electrode or another electrode. This allows images to be observed through a viewing sheet or an opposite electrode.

The structure of the EPD device will be explained in more detail with reference to FIGS. 1 and 2.

FIG. 1 is a schematic planar view of an electrophoretic display (EPD) device in accordance with the conventional art, and FIG. 2 is a schematic sectional view of the electrophoretic display (EPD) of FIG. 1, which is taken along line 'II-II' of FIG. 2.

As shown in FIGS. 1 and 2, the conventional EPD device comprises: a lower substrate 51 having a plurality of gate lines and data lines (not shown) crossing each other, a pixel electrode 67, and a thin film transistor (TFT) to electrically connect the gate lines to the pixel electrode 67; an upper substrate 75 having a common electrode 73 facing the pixel electrode 67 and generating an electric field; a display layer 71 formed between the lower substrate 51 and the upper substrate 75; and a seal pattern 77 for sealing each outer circumferential surface of the lower substrate 51, the upper substrate 75, and the display layer 71.

As shown in FIG. 2, on the lower substrate 51, formed are a plurality of gate lines (not shown) in a horizontal direction, and a gate electrode 53 extending from the gate lines.

A gate insulating film 55 and a semiconductor layer 57 are sequentially formed on the lower substrate 51 including the gate electrode 53 and the gate lines (not shown).

A resistive contact member doped with 'n' type impurities with high concentration, an ohmic contact layer 59 is formed on the semiconductor layer 57. Here, the ohmic contact layer 59 is formed on the semiconductor layer 57 at both sides of the gate electrode 53.

On the ohmic contact layer 59 and the gate insulating film 55, formed are a plurality of data lines (not shown), a source electrode 61 extending from the data lines, and a drain electrode 63 of the TFT.

On the source electrode 61, the drain electrode 63, the semiconductor layer 57, and the gate insulating film 55, formed is a passivation film 65 composed of a low dielectric insulating material having an excellent planarization characteristic.

At the passivation film 65, formed are a contact hole 67 that exposes the drain electrode 63, and a pixel electrode 69 electrically connected to the drain electrode 63.

The display layer 71 is provided with a plurality of electrophoretic substances 71a including electronic ink having pigment particles. The pigment particles are represented as black and white, and are charged positively and negatively, respectively.

The common electrode 73 formed of a transparent conductive material is formed on an entire surface of the display layer 71, thereby forming an electric field to drive pigment particles charged positively and negatively with facing the pixel electrode 67.

The upper substrate 75 formed of glass or plastic, etc. is laminated on the common electrode 73. Here, the upper substrate 75 is laminated on the lower substrate 51 through a laminator, and then is bonded onto the lower substrate 51 by an adhesive.

The seal pattern 77 is formed by a sealing process with a sealant on each outer circumferential surface of the lower substrate 51, the upper substrate 75, and the display layer 71 interposed between the two substrates. More specifically, once a sealant is dispensed between the upper substrate 75 and the display layer 71, the sealant is filled therebetween by a tensile force thereby to form the seal pattern 77.

In the conventional EPD device, a voltage is applied to the two facing electrodes 67 and 73 to generate a potential difference on both of the electrodes. Thus, the charged pigment particles of black and white are moved to the electrodes having different polarities so as to display images. Accordingly, an observer (not shown) can view images of black and white.

However, the conventional EPD device is fabricated with the following difficulties at the time of dispensing a sealant.

Referring to FIG. 1, a sealant 77a is dispensed on each outer circumferential surface of the lower substrate 51, the upper substrate 75, and the display layer 71 interposed between the two substrates. The dispensed sealant 77a serves to form the seal pattern 77 through a sealing process. However, as times lapses after the sealant 77a is dispensed, the sealant 77a flows up to undesired regions. This may cause unnecessary process margins at the time of subsequent processes.

Particularly, a part of the sealant 77a occupies a part of a bonding region of a driving circuit, which causes the driving circuit to be bonded to the lower substrate with difficulty, and a display panel to be discarded.

Furthermore, while the sealant having been dispensed to a part of the display panel is filled between the upper substrate and the display layer by a tensile force, the sealant continues to flow to a reverse direction, i.e., outside of the display panel, the bonding region of the driving circuit.

As shown in FIG. 1, in the case that a part of the sealant 77a flows in a reverse direction (i.e., a part of the sealant 77a is separated from the seal pattern at each edge and each corner of the EPD device), sealant inferiority occurs due to interference between a flexible printed circuit (FPC) and the driving circuit. As the sealant flows to unnecessary regions, the entire usage amount of the sealant is increased at the time of forming the seal pattern.

In order to obtain a sealant margin, the size of the display panel has to be increased, or an active region has to be decreased. This decreased active region may cause a design margin to be decreased.

Furthermore, since a large amount of sealant is required at the time of a sealant dispensing process, a sealant discharge time is increased to increase the entire process time. This may degrade the productivity and require additional installations.

BRIEF SUMMARY

An electrophoretic display (EPD) device, comprises: gate lines and data lines crossing each other to define a pixel region, and formed on a lower substrate; a thin film transistors (TFT) electrically connected to the gate lines and the data lines; a passivation film covering the TFT; a pixel electrode electrically connected to the TFT; a display layer formed on the pixel electrode and the passivation film, and having an electrophoretic substance; a common electrode formed on an entire surface of the display layer; an upper substrate formed on the common electrode; a seal pattern formed on each outer circumferential surface of the lower substrate, the upper substrate, and the display layer; and a dam pattern formed on the lower substrate adjacent to the seal pattern.

Also disclosed is a method for fabricating an electrophoretic display (EPD) device, comprising: forming a thin film transistor (TFT) consisting of gate lines, data lines, and semiconductor layers on a lower substrate; forming a passivation layer on the TFT; forming a pixel electrode electrically connected to the TFT on the passivation film; forming a display layer having an electrophoretic substance on the pixel electrode and the passivation film; forming a common electrode on an entire surface of the display layer; forming an upper substrate on the common electrode; forming a seal pattern on each outer circumferential surface of the lower substrate, the upper substrate, and the display layer; and forming a dam pattern on the lower substrate adjacent to the seal pattern.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings.

Hereinafter, an electrophoretic display (EPD) device and a method for fabricating the same according to the present invention will be explained in more detail with reference to the attached drawings.

Figure 1:
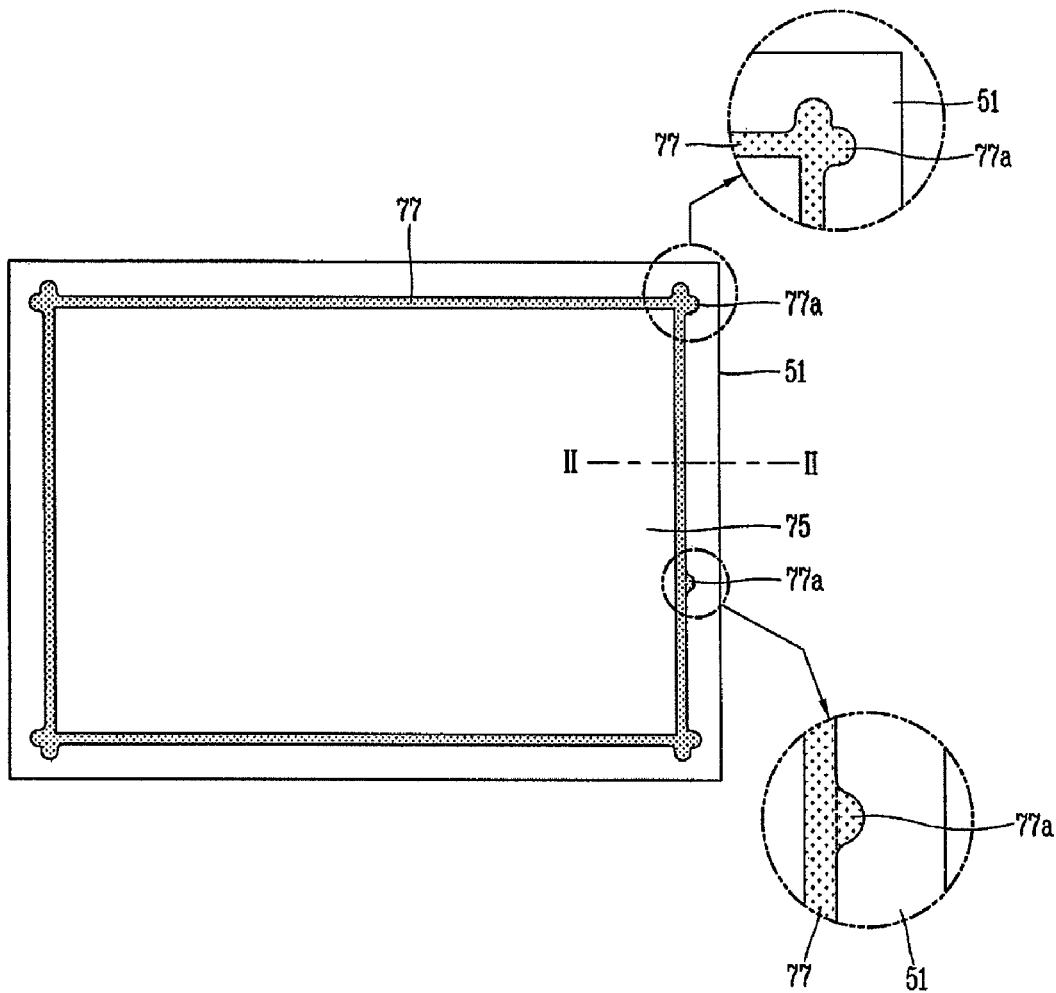
FIG. 1 is a schematic planar view of an electrophoretic display (EPD) device in accordance with the conventional art.
Figure 2:
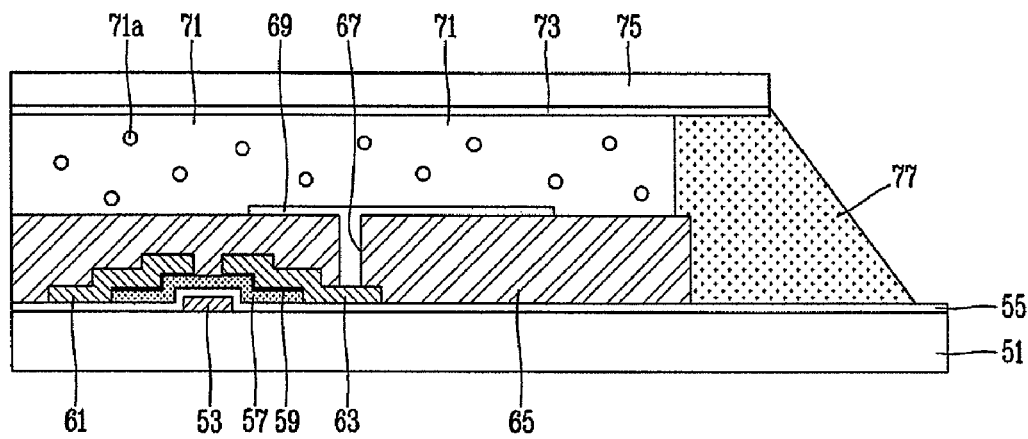
FIG. 2 is a schematic sectional view of the electrophoretic display (EPD) of FIG. 1, which is taken along line 'II-II' of FIG. 2.
Figure 3:
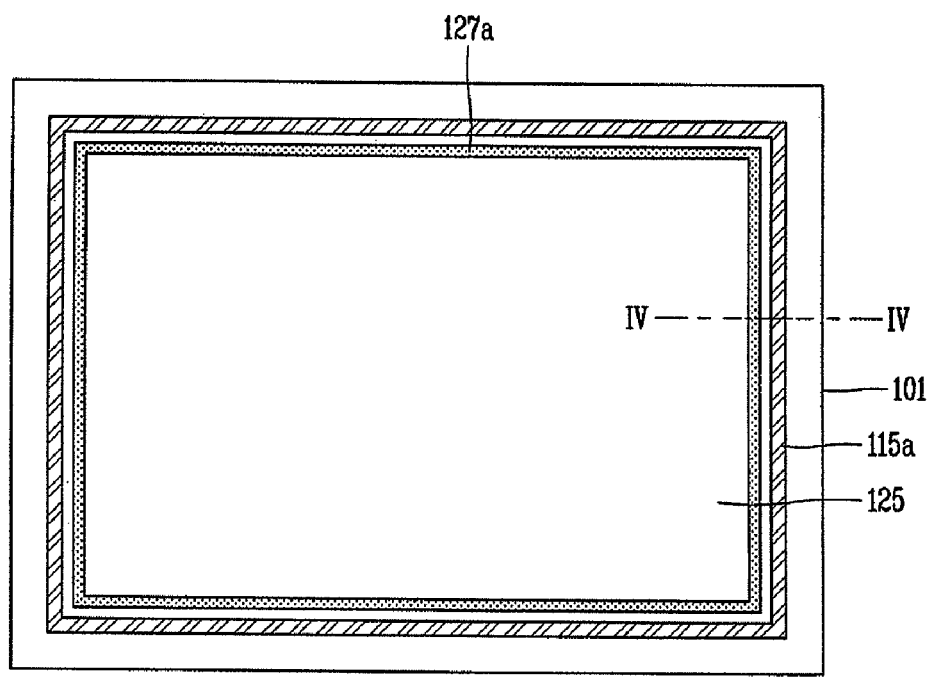
FIG. 3 is a schematic planar view of an electrophoretic display (EPD) device according to one embodiment of the present invention.
Figure 4:
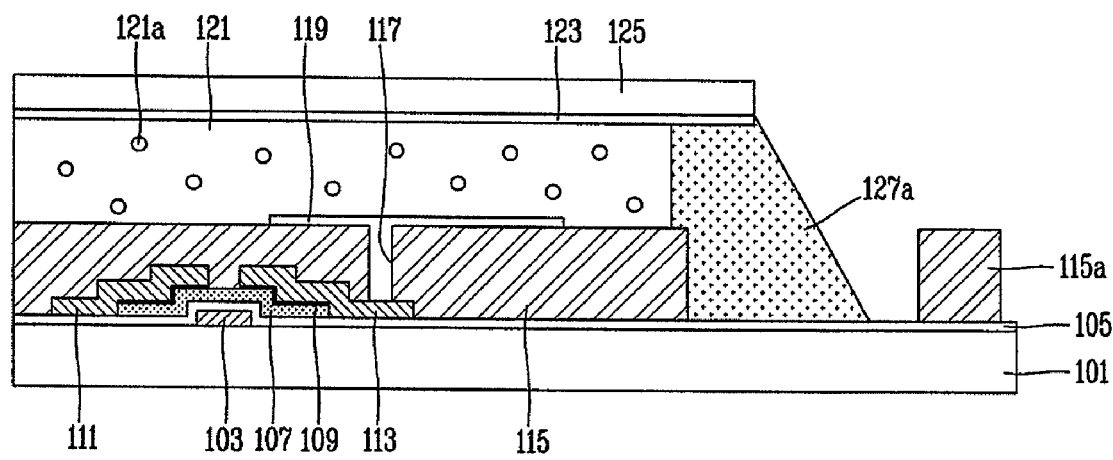
FIG. 4 is a schematic sectional view of the electrophoretic display (EPD) of FIG. 3, which is taken along line 'IV-IV' of FIG. 3.

FIG. 3 is a schematic planar view of an electrophoretic display (EPD) device according to one embodiment of the present invention, and FIG. 4 is a schematic sectional view of the electrophoretic display (EPD) of FIG. 3, which is taken along line 'IV-IV' of FIG. 3.

As shown in FIG. 3, an electrophoretic display (EPD) device according to one embodiment of the present invention comprises: a lower substrate 101; a display layer (not shown) formed on the lower substrate 101, and displaying images; an upper substrate 125 formed on the lower substrate 101; a seal pattern 127a formed on each outer circumferential surface of the lower substrate, 101, the upper substrate 125, and the display layer; and a dam pattern 115a formed to be adjacent to outside of the seal pattern 127a.

As shown in FIG. 4, the EPD device according to one embodiment of the present invention comprises: a lower substrate 101 having a plurality of gate lines and data lines (not shown) crossing each other, a pixel electrode 119, and a thin film transistor (TFT) to electrically connect the gate lines to the pixel electrode 119; an upper substrate 125 having a common electrode 123 to generate an electric field with facing the pixel electrode 119; a display layer 121 formed between the lower substrate 101 and the upper substrate 125; a seal pattern 127a formed on each outer circumferential surface of the lower substrate 101, the upper substrate 125, and the display layer 121; and a dam pattern 115a for preventing a part of a sealant from leaking to a bonding region of a driving circuit.

In the EPD device according to one embodiment of the present invention, a voltage is applied to the two facing electrodes 119 and 123 to generate a potential difference on both of the electrodes. Thus, charged pigment particles of black and white are moved to the electrodes having different polarities so as to display images. Accordingly, an observer (not shown) can view images of black and white.

As shown in FIG. 4, on the lower substrate 101, formed are a plurality of gate lines (not shown) and a gate electrode 103 extending from the gate lines.

A gate insulating film 105 and a semiconductor layer 107 are sequentially formed on the lower substrate 101 including the gate electrode 103 and the gate lines (not shown).

A resistive contact member doped with 'n' type impurities with high concentration, an ohmic contact layer 109 is formed on the semiconductor layer 107. Here, the ohmic contact layer 109 is formed on the semiconductor layer 107 at both sides of the gate electrode 103.

On the ohmic contact layer 109 and the gate insulating film 105, formed are a plurality of data lines (not shown), and source and drain electrodes 111 and 113 of the TFT extending from the data lines.

On the source electrode 111, the drain electrode 113, the semiconductor layer 107, and the gate insulating film 105, formed is a passivation film 115 composed of a low dielectric insulating material having an excellent planarization characteristic.

At the passivation film 115, formed are a contact hole 117 that exposes the drain electrode 113, and a pixel electrode 119 electrically connected to the drain electrode 113.

The display layer 121 is provided with a plurality of electrophoretic substances 121a including electronic ink having pigment particles. The pigment particles are represented as black and white, and are charged positively and negatively, respectively.

The common electrode 123 formed of a transparent conductive material is formed on an entire surface of the display layer 121, thereby forming an electric field to drive pigment particles charged positively and negatively with facing the pixel electrode 119.

The upper substrate 125 formed of glass, plastic, or steel foil, etc. is laminated on the common electrode 123. Here, the upper substrate 125 is laminated on the lower substrate 101 through a laminator, and then is bonded onto the lower substrate 101 by an adhesive.

The seal pattern 127a is formed by a sealing process with a sealant on each outer circumferential surface of the lower substrate 101, the upper substrate 125, and the display layer 121 interposed between the two substrates. More concretely, once a sealant is dispensed on each outer circumferential surface of the upper substrate 125 and the display layer 121, the sealant is filled between the upper substrate 125 and the display layer 121 by a tensile force, thereby forming the seal pattern 127a.

Moreover, the dam pattern 115a for delaying or preventing a part of the sealant dispensed so as to form the seal pattern 127a from leaking to the bonding region of the driving circuit is formed on the lower substrate 101 adjacent to the seal pattern 127a.

Hereinafter, a method for fabricating the EPD device according one embodiment of the present invention will be explained in more detail with reference to FIGS. 5A to 5E.

FIGS. 5A to 5E are sectional views showing processes for fabricating an electrophoretic display (EPD) device according to one embodiment of the present invention.

Figure 5A:
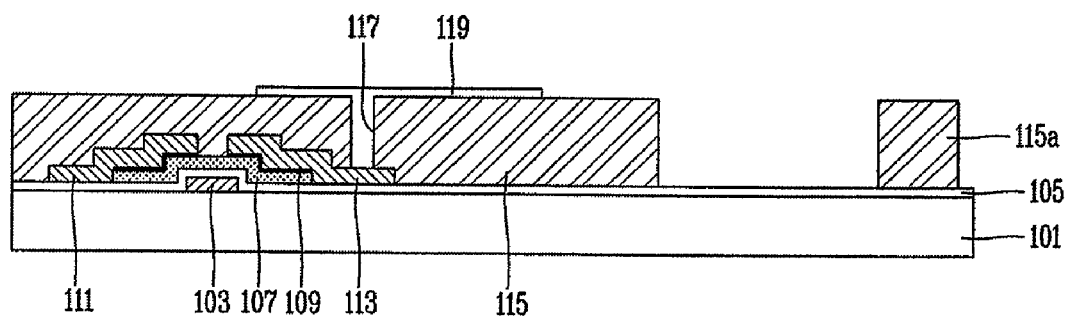
FIGS. 5A to 5E are sectional views showing processes for fabricating an electrophoretic display (EPD) device according to one embodiment of the present invention.
Figure 5B:
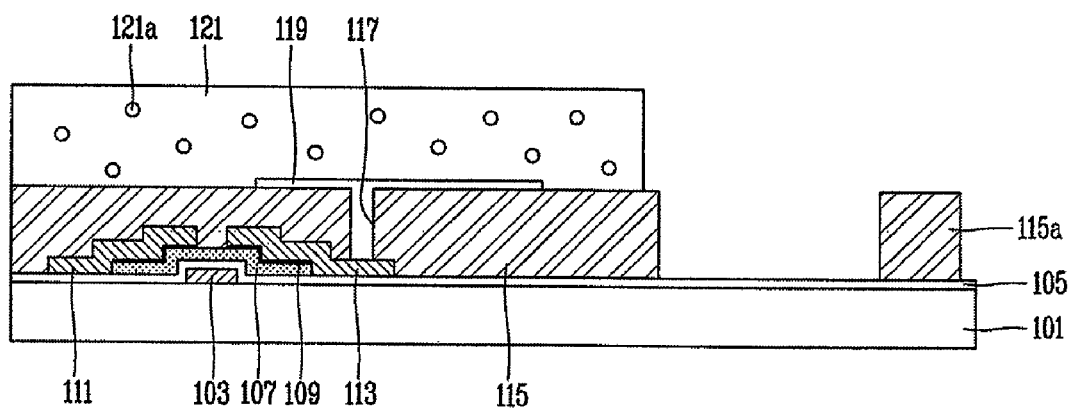
Figure 5C:
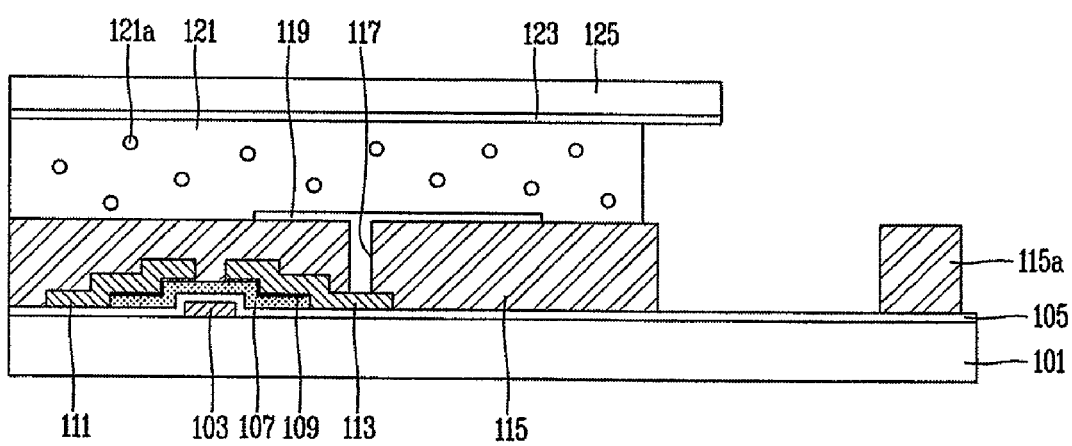
Figure 5D:
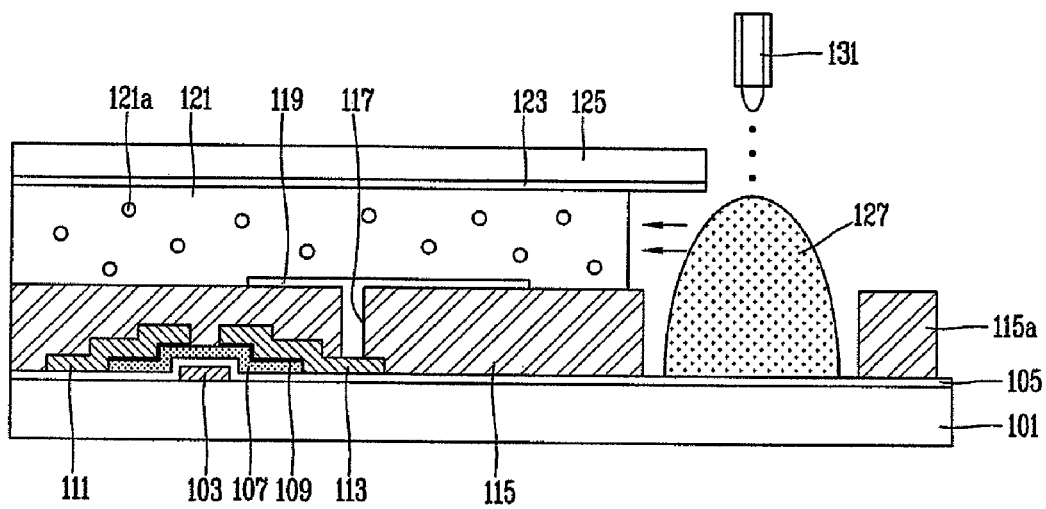
Figure 5E:
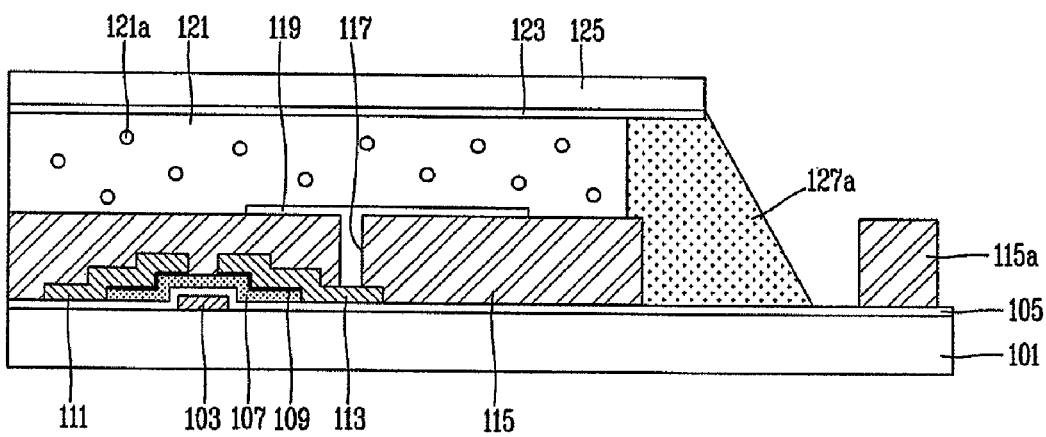

As shown in FIG. 5A, a low resistance conductive material formed of Ag, Ag alloy, Al, Sn, Mo, or Al alloy, Cr, Ti, Ta, MoW, etc. is dispensed on the lower substrate 101 formed of glass, plastic, or steel foil, and then is patterned to form a plurality of gate lines (not shown) and a storage lower electrode (not shown). Here, some of the gate lines are diverged to form the gate electrode 103 of the TFT.

Then, the gate insulating film 105 formed of insulation materials such as SiNx or SiOx is formed on the lower substrate 101 including the gate lines (not shown) and the gate electrode 103.

Then, the linear semiconductor layer 107 formed of hydrogenated amorphous silicon, etc. is formed on the gate insulating film 105. The linear semiconductor layer 107 constitutes a channel of the TFT.

Then, the ohmic contact layer 109, the resistive contact member formed of n+hydrogenated amorphous silicon doped with silicide or 'n' type impurities with high concentration is formed on the semiconductor layer 107. Here, the ohmic contact layer 109 is formed on the semiconductor layer 107 at both sides of the gate electrode 103. The ohmic contact layer 109 also serves to lower a contact resistance among the semiconductor layer 107, the data lines (not shown), and the drain electrode 113 by being disposed therebetween.

Then, a low resistance conductive material formed of Ag, Ag alloy, Al, Sn, Mo, or Al alloy, Cr, Ti, Ta, MoW, etc. is dispensed on the ohmic contact layer 109, the semiconductor layer 107, and the gate insulating film 105 by a sputtering method, and then is patterned, thereby forming the data lines (not shown), the drain electrode 113 of the TFT, and a storage upper electrode (not shown) overlapping the storage lower electrode (not shown). Here, the data lines (not shown) are arranged to cross the gate lines (not shown), and some diverged from the data lines constitutes the source electrode 111. The pair of source and drain electrodes 111 and 113 are partially or entirely disposed on the corresponding ohmic contact layer 109 with a separated state from each other.

The gate electrode 103, the gate insulating film 105, the semiconductor layer 107, and the source/drain electrodes 111 and 113 each sequentially deposited constitute a TFT that controls polarities of a voltage applied to a unit pixel region. And, the storage lower electrode (not shown), the gate insulating film 105, and the storage upper electrode (not shown) constitute a storage capacitance.

Then, the passivation film 115 formed of an acryl-based organic insulation material or SiOC or SiOF having an excellent planarization characteristic and a low dielectric constant is deposited by a chemical vapor deposition (CVD) method on the data lines (not shown), the drain electrode 113, and the exposed semiconductor layer 107 and gate insulating film 105. Here, an interlayer insulating film (not shown) formed of an insulation material such as silicon oxide or silicon nitride that covers a part of the exposed semiconductor layer 107a may be further formed below the passivation film 115.

Then, a photoresist (not shown) is dispensed on the passivation film 115, and then is exposed to light and developed by using a photolithography process technique. Then, the photoresist is patterned to form a photoresist film pattern (not shown). Here, the photoresist may be formed of not only a positive photoresist material, but also a negative photoresist material. The photoresist film pattern is disposed on the passivation film 115 except for a contact hole forming region that exposes a part of the drain electrode 113.

Then, the passivation film 115 is selectively removed by using the photoresist film pattern as a shielding film, thereby forming the contact hole 117 that exposes a part of the drain electrode 113 and forming the dam pattern 115a at an outer periphery of the lower substrate 101.

Then, the photoresist film pattern is removed, and a metal material having high reflectivity is dispensed on the passivation film 115 including the dam pattern 115a and the contact hole 117, and the exposed gate insulating film 105. Then, the metallic material is selectively patterned to form the pixel electrode 119 electrically connected to the drain electrode 113. Here, the pixel electrode 119 may be formed of not only a low resistance metallic material, but also a transparent conductive material. However, when the pixel electrode 119 is formed of a transparent conductive material, light having not been reflected by the electrophoretic substance is not reflected outwardly. Accordingly, the pixel electrode is preferably formed of a low resistance metallic material so as to enhance reflectivity.

Then, the display layer 121 including the electrophoretic substance 121a is formed on the passivation film 115 including the pixel electrode 119. The display layer 121 consists of a base film (not shown), the electrophoretic substance 121a, and an adhesion film (not shown). The display layer 121 may be formed by being bonded onto the passivation film 115, or may be formed by hardening a material consisting of an electrophoretic substance and a binder having been dispensed onto the passivation film 115. Here, the display layer 121 may be formed by bonding a film having bond paper of a front surface and a rear surface on the passivation film, or may be formed by hardening a material consisting of an electrophoretic substance and a binder having been dispensed by a spin coating method, a dipping method, a dispensing method, a printing method, an ink-jet method, or a screen deposition method, etc.

More concretely, the electrophoretic substance 121a is a micro-capsule having a diameter about 100 µm or less than. Not only charged pigment particles, but also a high-polymer material serving as a solvent are further added into the electrophoretic substance 121a. The number of the electrophoretic substances 121a may depend on the size of a unit pixel.

The electrophoretic substance 121a is formed in a capsule by mixing ionized pigment particles representing as black and white. The same amount of black pigment particles charged positively (+) and white pigment particles charged negatively (−) are mixed with each other, thereby forming a capsule. On the contrary, the same amount of white pigment particles charged positively (+) and black pigment particles charged negatively (−) are mixed with each other, thereby forming a capsule. That is, the black and white pigment particles inside one electrophoretic substance 121a are charged with different polarities.

Once an electric field is applied to the electrophoretic substance 121a, the black and white pigment particles move in opposite directions. Accordingly, the inside of one electrophoretic substance 121a is divided into two color regions. More concretely, when a positive electric field (+) is applied to the pixel electrode 119, positive black pigment particles (+) upwardly move, whereas negative white pigment particles (−) downwardly move. Accordingly, external light is reflected by the black pigment particles, thereby causing an observer to view black images. On the contrary, when a negative electric field (−) is applied to the pixel electrode 119, the positive black pigment particles (+) downwardly move, whereas the negative white pigment particles (−) upwardly move. Accordingly, external light is reflected by the white pigment particles, thereby causing an observer to view white images. When an arbitrary electric field is applied to the pixel electrode 119, the black and white pigment particles are aligned in upper and lower directions thereby to cause gray to be observed.

The black and white pigment particles are used to display black and white images. In order to display color images, R, G, and B color filter layers may be further formed on the display layer 121 including the electrophoretic substance 121a.

The common electrode 123 formed of a transparent conductive material such as ITO or IZO is entirely formed on the display layer 121 having the electrophoretic substance 121a with facing the pixel electrode 119. Here, the common electrode 123 faces the pixel electrode 119 to form an electric field to drive pigment particles charged positively or negatively.

Then, the upper substrate 125 formed of glass, plastic, or steel foil is bonded onto the common electrode 123 in a lamination manner.

Finally, a sealant 127 formed of thermal hardening resin or ultraviolet (UV) hardening resin is supplied through a needle 131 onto each outer circumferential surface of the lower substrate 101, the display layer 121, and the upper substrate 125. Then, the sealant 127 undergoes a hardening process for a predetermined time to form the seal pattern 127a. Here, the seal pattern 127a is formed by a screen printing method, a dispensing method, or other methods.

Hereinafter, the dispensing method for forming the seal pattern 127a will be explained in more detail.

Although not shown, in order to maintain a straight-line characteristic of the seal pattern, a dispenser corresponds to a predetermined edge of the lower substrate 101. Then, the predetermined edge is drawn into a straight line shape. Then, the dispenser is separated from the lower substrate 101, and then corresponds to the next edge of the lower substrate 101 by moving the lower substrate 101 or the dispenser. The next edge of the lower substrate 101 is drawn into a straight-line shape. More concretely, the lower substrate 101 of the EPD device is formed in a rectangular shape having four edges. In order to draw the seal pattern 127a, dispensing has to be performed four times with respect to four edges of each substrate, or a single dispensing has to be performed at one time with respect to four edges of each substrate.

Once the sealant 127 is dispensed onto each outer circumferential surface of the upper substrate 125 and the display layer 121, the sealant 127 moves between the upper substrate 125 and the display layer 121, and toward to an outer periphery of the lower substrate 101 by a tensile force. Accordingly, the sealant 127 completely dispensed on each outer circumferential surface of the upper substrate 125 and the display layer 121 is hardened as a predetermined time lapses, thereby remaining as the seal pattern 127a.

While the sealant 127 is filled between the upper substrate 125 and the display layer 121, the sealant 127 may flow to a reverse direction, i.e., an outer periphery of the lower substrate 101. However, the sealant 127 may be delayed or prevented from leaking to the outer periphery of the lower substrate 101 due to the dam pattern 127a formed at the outer periphery of the lower substrate 101.

An EPD device according to another embodiment of the present invention will be explained in more detail with reference to FIG. 6.

The EPD device according to another embodiment of the present invention is the same as the EPD device according to one embodiment except for a stepped portion. The stepped portion is formed at the passivation film extending from a TFT forming region of the lower substrate adjacent to the dam pattern so as to have a step from the dam pattern.

Figure 6:
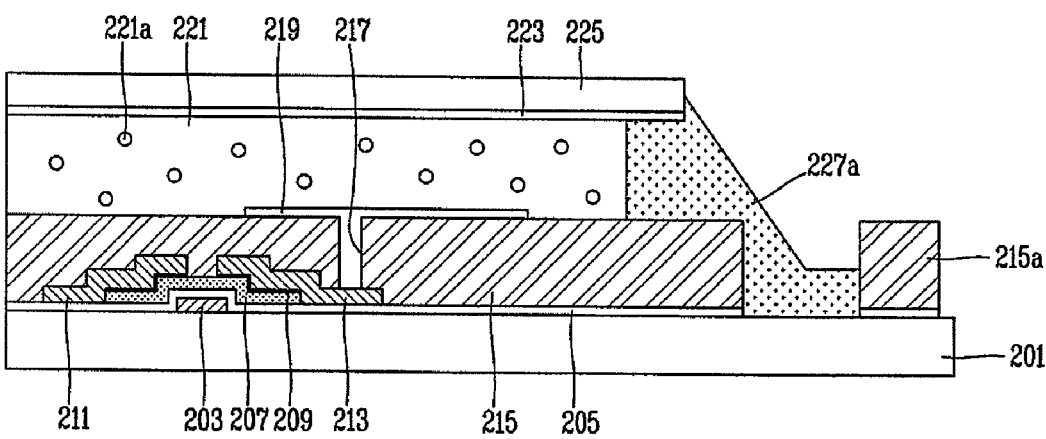
FIG. 6 is a schematic sectional view of an electrophoretic display (EPD) device according to another embodiment of the present invention.

FIG. 6 is a schematic sectional view of an electrophoretic display (EPD) device according to another embodiment of the present invention.

As shown in FIG. 6, the EPD device according to another embodiment of the present invention comprises: a lower substrate 201 having a plurality of gate lines and data lines (not shown) crossing each other, a pixel electrode 119, and a thin film transistor (TFT) to electrically connect the gate lines to the pixel electrode 219; an upper substrate 225 having a common electrode 223 to generate an electric field with facing the pixel electrode 219; a display layer 221 formed between the lower substrate 201 and the upper substrate 225; a seal pattern 227a formed on each outer circumferential surface of the lower substrate 201, the upper substrate 225, and the display layer 221; and a dam pattern 215a for preventing a part of a sealant from leaking to a bonding region of a driving circuit.

In the EPD device according to another embodiment of the present invention, a voltage is applied to the two facing electrodes 219 and 223 to generate a potential difference on both of the electrodes. Thus, charged pigment particles of black and white are moved to the electrodes having different polarities so as to display images. Accordingly, an observer (not shown) can view images of black and white.

As shown in FIG. 6, on the lower substrate 201, formed are a plurality of gate lines (not shown) and a gate electrode 203 extending from the gate lines.

A gate insulating film 205 and a semiconductor layer 207 are sequentially formed on the lower substrate 201 including the gate electrode 203 and the gate lines (not shown).

A resistive contact member doped with 'n' type impurities with high concentration, an ohmic contact layer 209 is formed on the semiconductor layer 207. Here, the ohmic contact layer 209 is formed on the semiconductor layer 207 at both sides of the gate electrode 203.

On the ohmic contact layer 209 and the gate insulating film 205, formed are a plurality of data lines (not shown), and source and drain electrodes 211 and 213 of a TFT extending from the data lines.

On the source electrode 211, the drain electrode 213, the semiconductor layer 207, and the gate insulating film 205, formed is a passivation film 215 composed of a low dielectric insulating material having an excellent planarization characteristic.

At the passivation film 215, formed are a contact hole 217 that exposes the drain electrode 213, and a pixel electrode 219 electrically connected to the drain electrode 213.

The display layer 221 is provided with a plurality of electrophoretic substances 221a including electronic ink having pigment particles. The pigment particles are represented as black and white, and are charged positively and negatively, respectively.

The common electrode 223 formed of a transparent conductive material is formed on an entire surface of the display layer 221, thereby forming an electric field to drive pigment particles charged positively and negatively with facing the pixel electrode 219.

The upper substrate 225 formed of glass, plastic, or steel foil, etc. is laminated on the common electrode 223. Here, the upper substrate 225 is laminated on the lower substrate 201 through a laminator, and then is bonded onto the lower substrate 201 by an adhesive.

The seal pattern 227a is formed by a sealing process with a sealant on each outer circumferential surface of the lower substrate 201, the upper substrate 225, and the display layer 221 interposed between the two substrates. More concretely, once a sealant is on each outer circumferential surface of the upper substrate 225 and the display layer 221, the sealant is filled between the upper substrate 225 and the display layer 221 by a tensile force, thereby forming the seal pattern 227a.

Moreover, the dam pattern 215a for delaying or preventing a part of the sealant dispensed so as to form the seal pattern 227a from leaking to the bonding region of the driving circuit is formed on the lower substrate 201 adjacent to the seal pattern 227a. Here, the dam pattern 215a is adjacent to the passivation film 215 extending from the TFT, and a stepped portion 218 having a constant step is formed between the passivation film 215 and the dam pattern 215a.

Hereinafter, a method for fabricating the EPD device according another embodiment of the present invention will be explained in more detail with reference to FIGS. 7A to 7E.

FIGS. 7A to 7E are sectional views showing processes for fabricating an electrophoretic display (EPD) device according to one embodiment of the present invention.

Figure 7A:
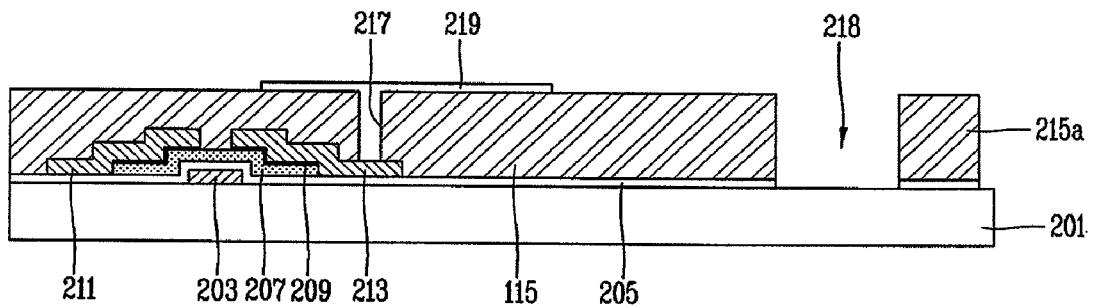
FIGS. 7A to 7E are sectional views showing processes for fabricating an electrophoretic display (EPD) device according to another embodiment of the present invention.
Figure 7B:
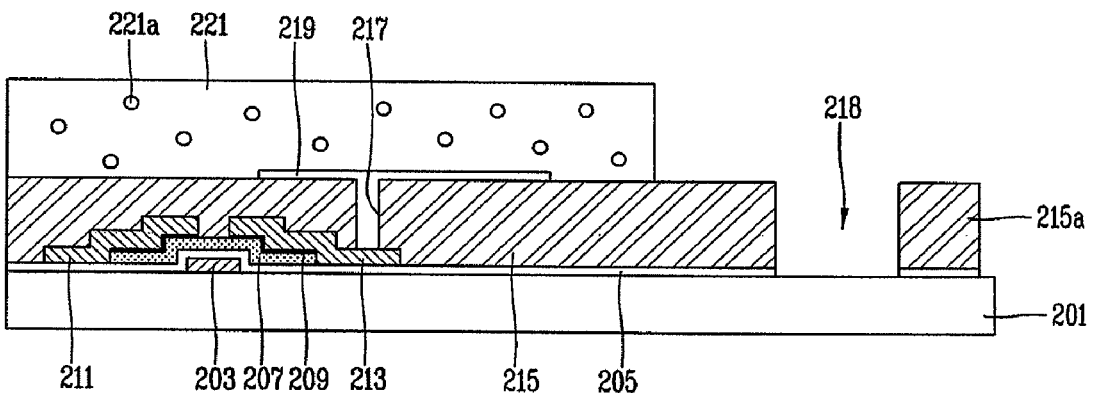
Figure 7C:
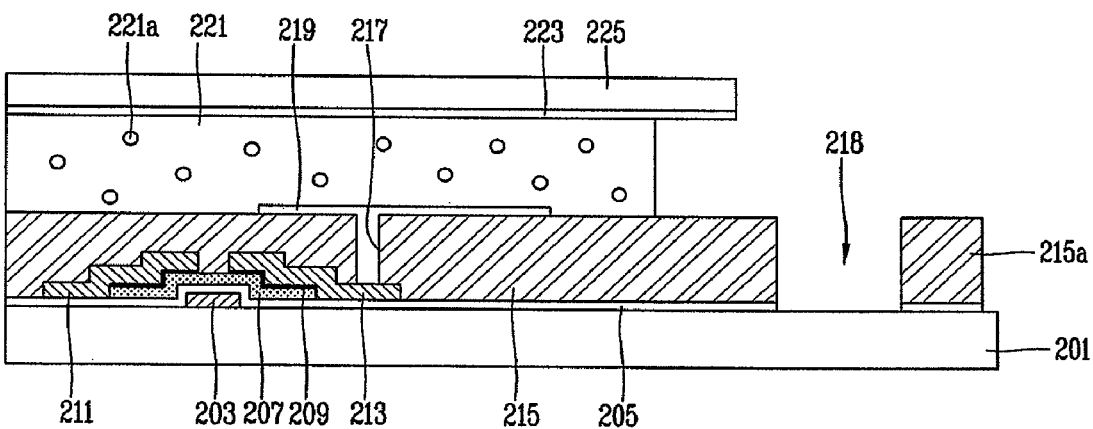
Figure 7D:
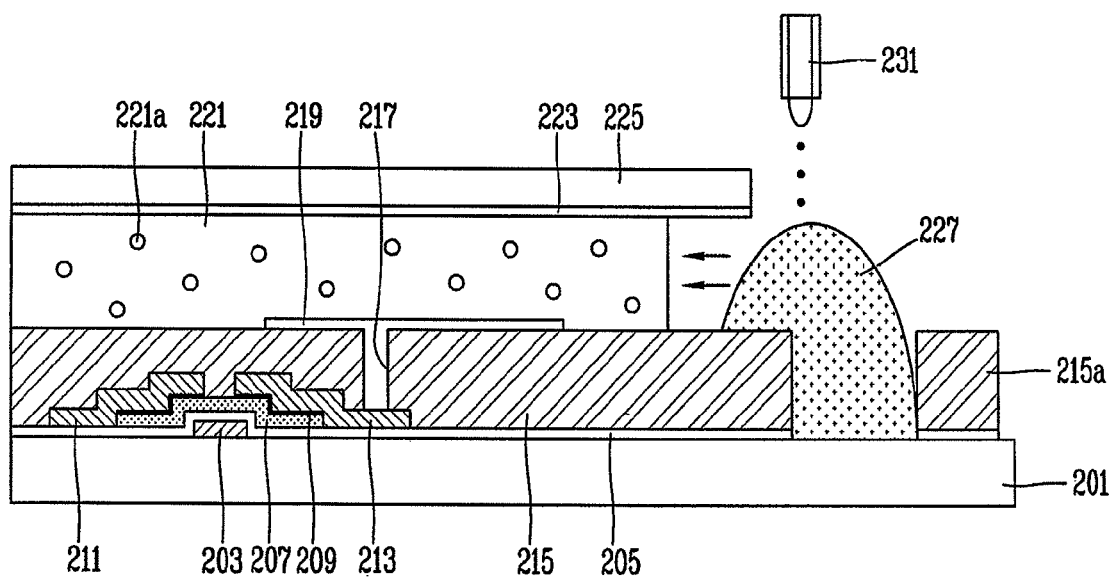
Figure 7E:
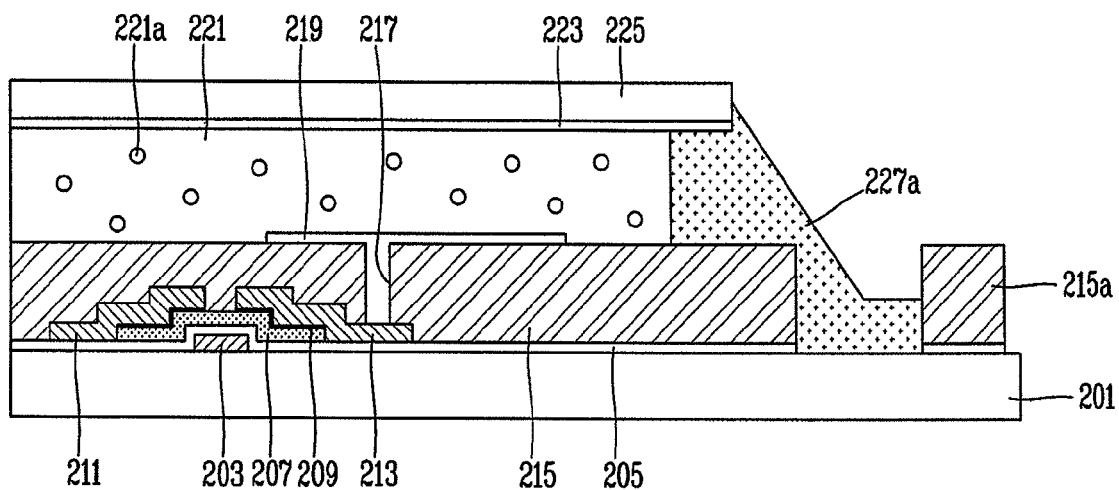

As shown in FIG. 7A, a low resistance conductive material formed of Ag, Ag alloy, Al, Sn, Mo, or Al alloy, Cr, Ti, Ta, MoW, etc. is dispensed on the lower substrate 201 formed of glass, plastic or steel foil, etc., and then is patterned to form a plurality of gate lines (not shown) and a storage lower electrode (not shown). Here, some of the gate lines are diverged to form the gate electrode 203 of the TFT.

Then, the gate insulating film 205 formed of insulation materials such as SiNx or SiOx is formed on the lower substrate 201 including the gate lines (not shown) and the gate electrode 203.

Then, the linear semiconductor layer 207 formed of hydrogenated amorphous silicon, etc. is formed on the gate insulating film 205. The linear semiconductor layer 207 constitutes a channel of the TFT.

Then, the ohmic contact layer 209, the resistive contact member formed of n+ hydrogenated amorphous silicon doped with silicide or 'n' type impurities with high concentration is formed on the semiconductor layer 207. Here, the ohmic contact layer 209 is formed on the semiconductor layer 207 at both sides of the gate electrode 203. The ohmic contact layer 209 also serves to lower a contact resistance among the semiconductor layer 207, the data lines (not shown), and the drain electrode 213 by being disposed therebetween.

Then, a low resistance conductive material formed of Ag, Ag alloy, Al, Sn, Mo, or Al alloy, Cr, Ti, Ta, MoW, etc. is dispensed on the ohmic contact layer 209, the semiconductor layer 207, and the gate insulating film 205 by a sputtering method, and then is patterned, thereby forming the data lines (not shown), the drain electrode 213 of the TFT, and a storage upper electrode (not shown) overlapping the storage lower electrode (not shown). Here, the data lines (not shown) are arranged to cross the gate lines (not shown), and some diverged from the data lines constitutes the source electrode 211. The pair of source and drain electrodes 211 and 213 are partially or entirely disposed on the corresponding ohmic contact layer 209 with a separated state from each other.

The gate electrode 203, the gate insulating film 205, the semiconductor layer 207, and the source/drain electrodes 211 and 213 each sequentially deposited constitute a TFT that controls polarities of a voltage applied to a unit pixel region. And, the storage lower electrode (not shown), the gate insulating film 205, and the storage upper electrode (not shown) constitute a storage capacitance.

Then, the passivation film 215 formed of an acryl-based organic insulation material or SiOC or SiOF having an excellent planarization characteristic and a low dielectric constant is deposited by a chemical vapor deposition (CVD) method on the data lines (not shown), the drain electrode 213, and the exposed semiconductor layer 207 and gate insulating film 205. Here, an interlayer insulating film (not shown) formed of an insulation material such as SiOx or SiNx that covers a part of the exposed semiconductor layer 207a may be further formed below the passivation film 215.

Then, a photoresist (not shown) is dispensed on the passivation film 215, and then is exposed to light and developed by using a photolithography process technique. Then, the photoresist is patterned to form a photoresist film pattern (not shown). Here, the photoresist may be formed of not only a positive photoresist material, but also a negative photoresist material. The photoresist film pattern is disposed on the passivation film 115 except for the drain electrode 213 and the stepped portion 218 of FIG. 7.

Then, the passivation film 215 is selectively removed by using the photoresist film pattern (not shown) as a shielding film, thereby forming the contact hole 217 that exposes a part of the drain electrode 213 and forming the dam pattern 215a and the stepped portion 218 at an outer periphery of the lower substrate 201. Here, the damper pattern 215a and the passivation film 215 have a predetermined step therebetween due to the stepped portion 218.

Then, the photoresist film pattern (not shown) is removed, and a metal material having high reflectivity is dispensed on the passivation film 215 including the dam pattern 215a and the contact hole 217, and the exposed gate insulating film 205. Then, the metallic material is selectively patterned to form the pixel electrode 219 electrically connected to the drain electrode 213. Here, the pixel electrode 219 may be formed of not only a low resistance metallic material, but also a transparent conductive material. However, when the pixel electrode 219 is formed of a transparent conductive material, light having not been reflected by the electrophoretic substance is not reflected outwardly. Accordingly, the pixel electrode 219 is preferably formed of a low resistance metallic material so as to enhance reflectivity.

Then, the display layer 221 including the electrophoretic substance 121a is formed on the passivation film 215 including the pixel electrode 219. The display layer 221 consists of a base film (not shown), the electrophoretic substance 221a, and an adhesion film (not shown). The display layer 221 may be formed by being bonded onto the passivation film 215, or may be formed by hardening a material consisting of an electrophoretic substance and a binder having been dispensed onto the passivation film 215. Here, the display layer 221 may be formed by bonding a film having bond paper consisting of a front surface and a rear surface on the passivation film, or may be formed by hardening a material consisting of an electrophoretic substance and a binder having been dispensed by a spin coating method, a dipping method, a dispensing method, a printing method, an ink-jet method, or a screen deposition method, etc.

More concretely, the electrophoretic substance 221a is a micro-capsule having a diameter about 100 μm or less than. Not only charged pigment particles, but also a high-polymer material serving as a solvent are further added into the electrophoretic substance 221a. The number of the electrophoretic substances 221a may depend on the size of a unit pixel.

The electrophoretic substance 221a is formed in a capsule by mixing ionized pigment particles representing as black and white. The same amount of black pigment particles charged positively (+) and white pigment particles charged negatively (−) are mixed with each other, thereby forming a capsule. On the contrary, the same amount of white pigment particles charged positively (+) and black pigment particles charged negatively (−) are mixed with each other, thereby forming a capsule. That is, the black and white pigment particles inside one electrophoretic substance 221a are charged with different polarities.

Once an electric field is applied to the electrophoretic substance 221a, the black and white pigment particles move in opposite directions. Accordingly, the inside of one electrophoretic substance 221a is divided into two color regions. More concretely, when a positive electric field (+) is applied to the pixel electrode 219, positive black pigment particles (+) upwardly move, whereas negative white pigment particles (−) downwardly move. Accordingly, external light is reflected by the black pigment particles, thereby causing an observer to view black images. On the contrary, when a negative electric field (−) is applied to the pixel electrode 219, the positive black pigment particles (+) downwardly move, whereas the negative white pigment particles (−) upwardly move. Accordingly, external light is reflected by the white pigment particles, thereby causing an observer to view white images. When an arbitrary electric field is applied to the pixel electrode 219, the black and white pigment particles are aligned in upper and lower directions thereby to cause gray to be observed.

The black and white pigment particles are used to display black and white images. In order to display color images, R, G, and B color filter layers may be further formed on the display layer 221 including the electrophoretic substance 221a.

The common electrode 223 formed of a transparent conductive material such as ITO or IZO is formed on an entire surface of the display layer 221 having the electrophoretic substance 221a with facing the pixel electrode 219. Here, the common electrode 223 faces the pixel electrode 219 to form an electric field to drive pigment particles charged positively or negatively.

Then, the upper substrate 225 formed of glass, plastic, or steel foil is bonded onto the common electrode 223 in a lamination manner.

Finally, a sealant 227 formed of thermal hardening resin or ultraviolet (UV) hardening resin is supplied through a needle 231 onto each outer circumferential surface of the stepped portion 218 of the lower substrate 201, the display layer 221, and the upper substrate 225. Then, the sealant 227 undergoes a hardening process for a predetermined time to form the seal pattern 227a. Here, the seal pattern 227a is formed by a screen printing method, a dispensing method, or other methods.

Once the sealant 227 is dispensed onto each outer circumferential surface of the stepped portion 218 of the lower substrate 201, the upper substrate 225, and the display layer 221, the sealant 227 moves between the upper substrate 225 and the display layer 221, and toward the dam pattern 215 formed at an outer periphery of the lower substrate 201 by a tensile force. Accordingly, the sealant 227 completely dispensed between the upper substrate 225 and the display layer 221 is hardened as a predetermined time lapses, thereby remaining as the seal pattern 227a.

While the sealant 227 is entirely filled between the upper substrate 225 and the display layer 221, the sealant 227 may flow to a reverse direction, i.e., an outer periphery of the lower substrate 201. However, the sealant 227 may be delayed or prevented from leaking to the outer periphery of the lower substrate 201 due to the dam pattern 227a formed at the outer periphery of the lower substrate 201. Especially, the stepped portion 218 implemented as a part adjacent to the dam pattern 215a is formed to be lower than a peripheral region (TFT region) at the time of forming a TFT serves to delay or prevent the sealant 227 from leaking to the outer periphery of the lower substrate 201.

The EPD device and the method for fabricating the same according to the present invention have the following effects.

Firstly, once the sealant having been dispensed to each entire outer circumferential surface of the upper substrate, the display layer, and the lower substrate is filled between the upper substrate and the display layer, the sealant is delayed or prevented from leaking to a reverse direction due to the dam pattern.

Secondly, as the panel size is decreased or active size is increased by a decreased margin at the time of a sealing process, a usage amount of the sealant is reduced.

The sealant is easily moved between the upper substrate and the display layer by a tensile force, thereby reducing the fabrication time and enhancing the productivity.

Thirdly, as the dam pattern is formed at the time of a TFT forming process, additional costs or processes are not required.

Fourthly, even if other materials such as a bonding sealant rather than the TFT pattern (i.e., passivation film) are dispensed or printed as a unit of several tens of μm, the same effects may be implemented.

Fifthly, as a large step is obtained by forming a part adjacent to the dam pattern to be lower than a peripheral region (TFT region) at the time of a TFT forming process, the sealant is delayed or prevented from leaking to a reverse direction.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An electrophoretic display (EPD) device, comprising:
   gate lines and data lines crossing each other to define a pixel region, and formed on a lower substrate;
   a thin film transistors (TFT) electrically connected to the gate lines and the data lines;
   a passivation film covering the TFT;
   a pixel electrode electrically connected to the TFT;
   a display layer formed on the pixel electrode and the passivation film, and having an electrophoretic substance;
   a common electrode formed on an entire surface of the display layer;
   an upper substrate formed on the common electrode;
   a seal pattern formed on each outer circumferential surface of the lower substrate, the upper substrate, and the display layer; and
   a dam pattern formed on the lower substrate adjacent to the seal pattern,
   wherein a stepped portion having a constant step from the dam pattern is provided between the passivation film and the dam pattern, wherein the dam pattern is formed by the same material as the passivation film, and wherein the stepped portion is formed by the dam pattern.

2. The EPD device of claim 1, wherein the upper substrate is formed of one of glass, plastic, and the low substrate is formed of one of glass, plastic, or steel foil.

3. The EPD device of claim 1, wherein the dam pattern is formed of the same material as the passivation film.

4. The EPD device of claim 1, wherein a stepped portion is provided between the passivation film and the dam pattern.

5. A method for fabricating an electrophoretic display (EPD) device, comprising:
   forming a thin film transistor (TFT) consisting of gate lines, data lines, and a semiconductor layer on a lower substrate;
   forming a passivation layer on the TFT;
   forming a pixel electrode electrically connected to the TFT on the passivation layer;
   forming a display layer having an electrophoretic substance on the pixel electrode and the passivation film;
   forming a common electrode on an entire surface of the display layer;
   forming an upper substrate on the common electrode;
   forming a seal pattern on each outer circumferential surface of the lower substrate, the upper substrate, and the display layer; and
   forming a dam pattern on the lower substrate adjacent to the seal pattern, wherein the dam pattern is formed by selectively patterning the passivation film before forming the pixel electrode, and
   wherein a stepped portion having a constant step from the dam pattern is formed together with the dam pattern by selectively patterning the passivation film before forming the pixel electrode.

6. The method of claim 5, wherein the upper substrate is formed of one of glass, plastic, and the low substrate is formed of one of glass, plastic, or steel foil.

* * * * *